United States Patent
Lamaka et al.

(10) Patent No.: US 10,637,117 B2
(45) Date of Patent: Apr. 28, 2020

(54) ELECTROLYTE ADDITIVES FOR MAGNESIUM AIR BATTERIES

(71) Applicant: Helmholtz-Zentrum Geesthacht Zentrum Fuer Material- und Kuestenforschung GmbH, Geesthacht (DE)

(72) Inventors: Sviatlana Lamaka, Geesthacht (DE); Daniel Höche, Hamburg (DE); Mikhail Zheludkevich, Geesthacht (DE)

(73) Assignee: Helmholtz-Zentrum Geestachts Zentrum Fuer Material—Und Kuestenforschung GmbH (DE)

( * ) Notice: Subject to any disclaimer, the term of this patent is extended or adjusted under 35 U.S.C. 154(b) by 124 days.

(21) Appl. No.: 15/689,498

(22) Filed: Aug. 29, 2017

(65) Prior Publication Data

US 2018/0069283 A1     Mar. 8, 2018

(30) Foreign Application Priority Data

Sep. 2, 2016  (EP) ..................... 16187152

(51) Int. Cl.
  *H01M 10/36* (2010.01)
  *H01M 12/08* (2006.01)
  (Continued)

(52) U.S. Cl.
  CPC ........... *H01M 12/08* (2013.01); *H01M 4/381* (2013.01); *H01M 4/466* (2013.01); *H01M 10/36* (2013.01);
  (Continued)

(58) Field of Classification Search
  None
  See application file for complete search history.

(56) References Cited

U.S. PATENT DOCUMENTS 4,617,244 A * 10/1986 Greene ................. H01M 10/08
                                                  429/203
6,143,443 A * 11/2000 Kazacos ............... H01M 8/188
                                                  429/188

(Continued)

FOREIGN PATENT DOCUMENTS

CN        103545578 A     1/2014

OTHER PUBLICATIONS

Sigma Aldrich ACS data sheet (Year: 2015).*
(Continued)

*Primary Examiner* — Lucas J. O'Donnell
(74) *Attorney, Agent, or Firm* — Nields, Lemack & Frame, LLC

(57) ABSTRACT

The present invention relates to electrolyte additives for magnesium air batteries, which are compatible with rechargeable magnesium batteries and carry the promise of overcoming the hurdles, especially enhancing the overall performance of magnesium air batteries comprising an aqueous electrolyte. The electrolyte additive for a magnesium battery comprising a chelating agent which is capable of forming a complex with at least one of Fe(II), and Fe(III) ions, where the complex with at least one of Fe(II) and Fe(III) ions has a stability constant in aqueous solution at room temperature (about 25° C.) log K of greater than or equal to 6.0 and which is also capable of forming a complex with Mg(II) ions where the complex with Mg(II) ions has a stability constant in aqueous solution at room temperature (about 25° C.) log K of greater than or equal to 4.0.

14 Claims, 2 Drawing Sheets

(51) Int. Cl.
H01M 12/06 (2006.01)
H01M 4/38 (2006.01)
H01M 4/46 (2006.01)

(52) U.S. Cl.
CPC .... H01M 12/06 (2013.01); *H01M 2300/0002* (2013.01)

(56) References Cited

U.S. PATENT DOCUMENTS

2003/0181332 A1    9/2003  Sedun et al.
2017/0077524 A1*   3/2017  Suyama .............. H01M 12/06

OTHER PUBLICATIONS

Park "Complex Formation between Iron (III) and Some Substituted Salicylic Acids" Journal of the American Chemical Society, 1966 (Year: 1966).*
Pstova et al. (Metal-Chelating Properties, Electrochemical Behavior, Scavenging and Cytoprotective Activities of Six Natural Phenolics Biomed Papers 147(2), 147-53 2003 (Year: 2003).*
National Institute of Health's National Cancer Institute's Dictionary of Cancer Terms; dictionary definition of chelator (Year: 2018).*
The Dictionary of Cell & Molecular Biology, J.M. Lackie, 2007, definition of chelation (Year: 2007).*
Dawson et al., "Data for Biochemical Research," 3rd Edition, 1995.
Dean, "Lange's Handbook: of Chemistry," 15th Edition, McGraw-Hill Inc.,1999 (Section 8, Table 8.12-8.13).
Furia, "Stability Constants (log K1) of Various Metal Chelates," Sequestrants in food, CRC Handbook of Food Additives, 2nd Edition, pp. 271-294, 1972.
Mohtadi et al., "Magnesium batteries: Current state of the art, issues and future perspectives", Beilstein Journal of Nanotechnology, vol. 5, pp. 1291-1311, 2014.
Martell et al., "Critical Stability Constants, vol. 2: Amines," 1975.
Martell et al., "Critical Stability Constants, vol. 3: Other Organic Ligands," 1977.
Martell et al., "Critical Stability Constants, vol. 4: Inorganic Complexes," 1976.
Martell et al., "Critical Stability Constants, vol. 5: First Supplement," 1982.
Martell et al., "Critical Stability Constants, vol. 6: Second Supplement," 1989.
Wang et al., "Research Progress of Magnesium Anodes and their Applications in Chemical Power Sources," Transactions of Nonferrous Metals Society of China, vol. 24, pp. 2427-2439, 2014.
Watkins, Magnesium battery Electrolytes in iconic liquids (dissertation), May 2016, Arizona State University.

* cited by examiner

ELECTROLYTE ADDITIVES FOR MAGNESIUM AIR BATTERIES

FIELD OF THE INVENTION

The present invention relates to electrolyte additives for magnesium air batteries.

BACKGROUND OF THE INVENTION

Magnesium air batteries, i.e. batteries comprising a negative electrode (anode) comprising or consisting of magnesium or of a magnesium alloy, have been attracting an increased attention as magnesium possesses higher volumetric capacities than e.g. lithium, i.e., 3832 mAh cm$^{-3}$ for magnesium vs. 2061 mAh cm$^{-3}$ for lithium. Compared to nowadays commonly used lithium-ion batteries, magnesium air batteries are possibly about twice as powerful because of the high volumetric capacities. Additionally, the energy per mass is significantly higher for magnesium air batteries compared to lithium-ion batteries. More importantly, however, the electrochemical processes related to its reversible plating/stripping have demonstrated the absence of dendrites formation which has thus far alleviated safety concerns related to employing it as a negative electrode in batteries. Finally, magnesium may also provide an opportunity for battery cost reductions due to its natural abundance in the earth crust.

However, several technical challenges still hamper the commercialization of magnesium air batteries. In fact, the absence of practical electrolytes and cathodes has confined demonstrations of rechargeable magnesium batteries to research laboratories (cf. R. Mohtadi, F. Mizuno "*Magnesium batteries: Current state of the art, issues and future perspectives*", Beilstein J. Nanotechnol. 2014, 5, 1291-1211). That is, low gravimetric energy densities in the order of few hundreds watt hour per kilogram and a limited shown durability coupled with very sluggish kinetics make magnesium batteries currently far from being practical.

When discussing the magnesium metal, the nature of its interaction with the electrolyte has been recognized to represent an important and complex topic. That is, interfaces formed on the metal resulting from metal-electrolyte interaction have a direct impact on electro-chemical properties related to the dissolution and plating of the metal, i.e., discharge and theoretical charge of the battery. It is well established that the formation of a surface layer on magnesium anodes as a result of metal-electrolyte chemical/electrochemical interaction is detrimental for reversible magnesium deposition, as it blocks the transport of the magnesium ions thereby preventing reversible electrochemical dissolution and plating from taking place (cf. R. Mohtadi, F. Mizuno "*Magnesium batteries: Current state of the art, issues and future perspectives*", Beilstein J. Nanotechnol. 2014, 5, 1291-1211).

In particular, the use of aqueous electrolytes in magnesium air batteries may lead to problems such as enhanced anode corrosion, voltage drop, electrolyte instability and, in particular, self-corrosion processes leading to uncontrollable degradation and destruction of the magnesium anode. All of these processes lead to a reduction of overall battery performance and lifetime.

Until now, there have only been a few attempts to enhance the battery performance by controlling the interaction between the magnesium anode and the aqueous electrolyte and these attempts show a number of disadvantages such as overcharging, capacity fading, non-conductive passivation of the anode surface or voltage drop over time.

For example, in order to improve the performance of a magnesium battery, Wang et al. (cf. N. Wang et al., Research progress of magnesium anodes and their applications in chemical power sources, T Nonferr Metal Soc., 24 (2014) 2427-2439) applied different magnesium alloys as anode material (e.g. AZ series, AM series, Mg—Li) which lead to the possibility of tuning the microstructure of the anode and to a higher flexibility. However, the use of said alloys leads to undesired secondary effects such as unwanted reactions and to a voltage drop over time.

Therefore, there is still a need for new electrolyte compositions for magnesium air batteries operating in aqueous electrolyte environments, especially there is the need to provide efficient means for enhancing the overall performance of magnesium air batteries comprising an aqueous electrolyte.

SUMMARY OF THE INVENTION

It is therefore an object of the present invention to provide novel means for enhancing the performance of magnesium air batteries comprising an aqueous electrolyte. In particular, it is an object of the present invention to increase the voltage of a magnesium air battery and to minimize the voltage drop over time. It is further an object of the present invention to provide an aqueous electrolyte for magnesium air batteries that enhances the performance of the battery, increases the voltage of said battery and minimizes the voltage drop over time. Moreover, it is an object of the present invention to provide a novel magnesium air battery with an enhanced performance, increased voltage and a minimized voltage drop compared to known magnesium based batteries.

Surprisingly, this object is achieved by an electrolyte additive for a magnesium battery comprising a chelating agent which is capable of forming a complex with at least one of Fe(II), and Fe(III) ions, where the complex with at least one of Fe(II), and Fe(III) ions has a stability constant in aqueous solution at room temperature (about 25° C.) log K of greater than or equal to 6.0 and which is also capable of forming a complex with Mg(II) ions where the complex with Mg(II) ions has a stability constant in aqueous solution at room temperature (about 25° C.) log K of greater than or equal to 4.0.

DETAILED DESCRIPTION

Figure 1:
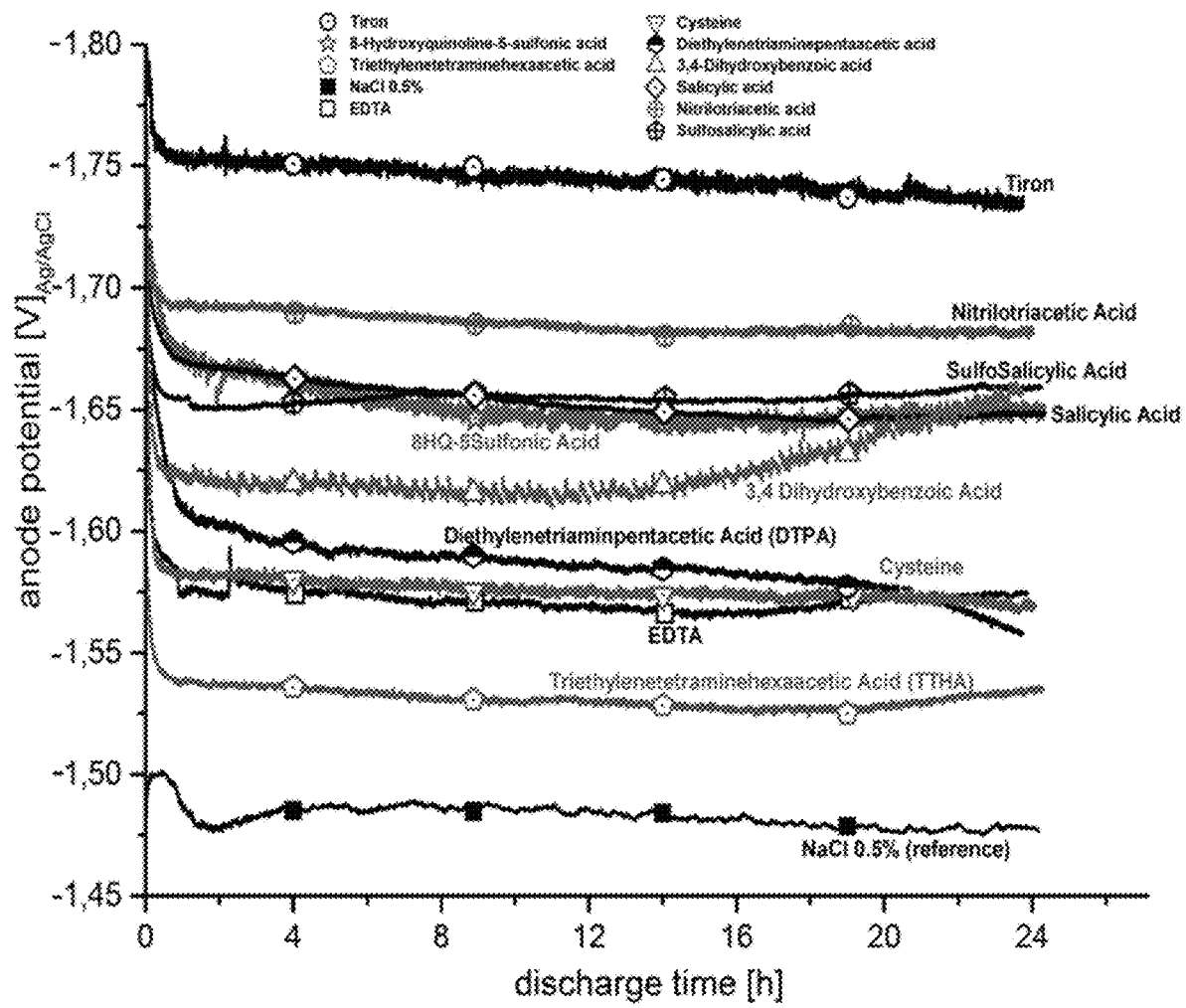
FIG. 1 is a graph of discharge time versus anode potential.

The term "stability constant", K, refers herein above and in the claims section to the equilibrium constant for the equilibrium that exists between a metal ion surrounded by water molecule ligands and the same transition metal ion surrounded by a ligand or ligands of another kind in a ligand displacement reaction for the overall displacement reaction.

The term "room temperature" refers herein above and in the claims section to the temperature of around 25° C.

The term "chelating agent" refers herein above and in the claims section to synthetic or natural molecules that bound to metal ions. Chelating agents are used for keeping divalent and polyvalent metal ions in solutions.

The present inventors found that surprisingly noble impurities in iron get detached from the magnesium anode by undermining mechanisms and dissolve by forming Fe(II) or Fe(III) ions. Subsequently, these ions are being reduced and re-deposit on the surface of the anode, which accelerates self-corrosion. Thus, based on this finding, it has been found that prevention of redeposition of these impurities significantly decreases the detrimental self-corrosion rate of the magnesium anode in aqueous electrolyte. Re-deposition of dissolved iron is effectively avoided by chemically binding said ions by means of complexing agents.

In an embodiment of the present invention, suitable chelating agents may comprise at least one aminopolycarboxylate, hydroxycarboxylate, hydroxysulfonate or amino acid chelating agent, or salts thereof and/or mixtures thereof.

In an embodiment of the present invention chelating agents include aminopolycarboxylates such as ethylenediaminetetraacetic acid (EDTA), diethylenetriamine-pentaacetic acid (DTPA), tri-ethylenetetraaminehexaacetic acid (TTHA), ethylenediamine-N,N'-bis(2-hydroxyphenylacetic acid) (EDDHA), N-(2-hydroxy-ethyl)ethylenediamine-N,N,N'-triacetic acid (HEDTA), ethylene-glycolbis(aminoethylether)-N,N,N',N'-tetraacetic acid (EGTA), 1,2-Bis(2-aminophenoxy)ethane-N,N,N',N'-acetic acid (BAPTA), N,N-bis(carboxymethyl)-L-glutamate (GLDA), trans-1,2-diaminocyclohexane-N,N,N',N'-tetraacetic acid (CDTA), nitrolotriacetic acid (NTA), salts thereof and mixtures thereof, and the like:

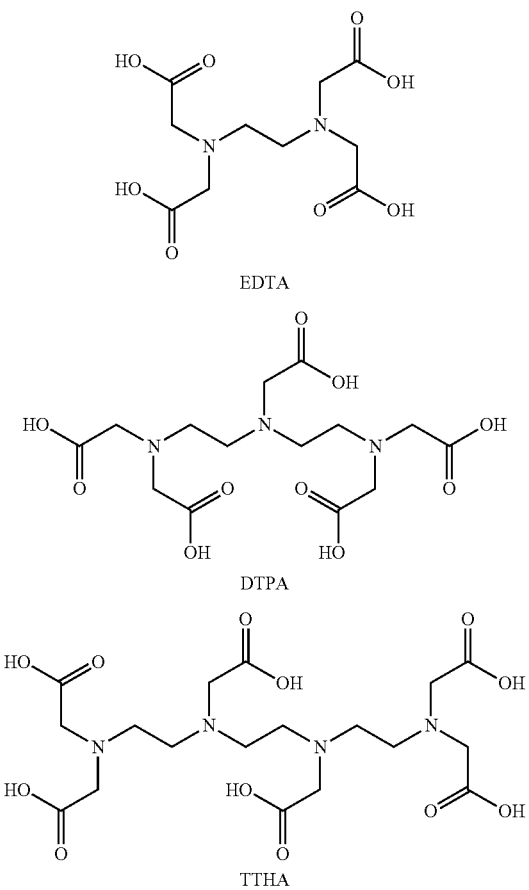

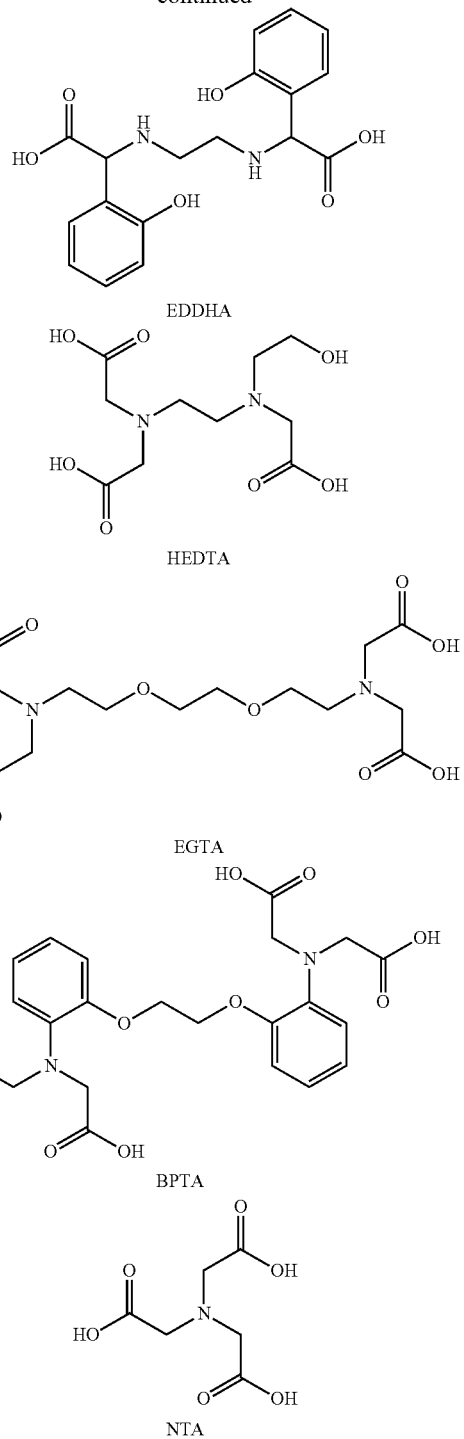

In another embodiment of the present invention, chelating agents include hydroxycarboxylates, preferably aromatic hydroxycarboxylates such as salicylic acid and its derivatives, e.g. sulfosalicylic acid, preferably 5-sulfosalicylic acid, methylsalicylic acid, preferably 5-methylsalicylic acid, aminosalicylic acid, preferably 4-aminosalicylic acid, 3,4-dihydroxybenzoic acid, salts thereof and mixtures thereof.

In still another embodiment of the present invention, chelating agents include hydroxysulfonates, preferably aromatic hydroxysulfonates such as 8-Hydroxyquinoline-5-sulfonic acid (8HQ SO$_3$) or pyrocatechol-3,5-disulphonic acid (TIRON), salts thereof and mixtures thereof.

In still another embodiment of the present invention, chelating agents include amino acid chelating agents, such as asparagine, cysteine, or salts thereof and mixtures thereof.

The chelating agents employed according to the present invention form stable complexes with Fe(II) or Fe(III) thereby preventing re-deposition of iron onto the anode and significantly decreasing the self-corrosion rate. Additionally, the chelating agents employed according to the present invention form complexes with Mg(II) and, thus, prevent formation of a surface layer on the anode. The chelating agents employed according to the present form complexes with at least one of Fe(II) and Fe(III) ions with a stability constant in aqueous solution at room temperature (about 25° C.) log K of greater than or equal to 6.0, preferably greater than or equal to 10.0, and with Mg(II) ions with a stability constant of in aqueous solution at room temperature (about 25° C.) log K of greater than or equal to 4.0, preferably greater than or equal to 5.5. Most preferably, however, that the chelating agents form complexes with at all of Fe(II), Fe(III) ions with a stability constant in aqueous solution at room temperature (about 25° C.) log K of greater than or equal to 6.0, and with Mg(II) ions with a stability constant in aqueous solution at room temperature (about 25° C.) log K of greater than or equal to 4.0.

The respective stability constants can e.g. be retrieved from the following sources, all of which are incorporated herein for reference:

Data for Biochemical Research, 1995, 3rd edition, R. M. C. Dawson, O. C. Elliot, W. H. Elliot, K. M. Jones;

Critical stability constants, 1975-1976, volumes 2-6. A. E. Martell, R. M. Smith (Eds.);

Sequestrants in food, in: T. E. Furia (Ed.), CRC Handbook of Food Additives, V. I, 2nd ed. 1972, pp. 271-294 (Chapter 6). T. E. Furia;

Lange's Handbook of Chemistry, 15th Ed. 13 McGraw-Hill, Inc., 1999 (Section 8, Table 8.12-8.13). J. A. Dean (Ed.);

Analytical and Biological products, p. 252, Metal Chelates, Dojindo catalogue.

It is preferred that the chelating agents are used in the electrolyte of a magnesium air battery in a concentration of $1.0*10^{-5}$ to 2.0 mol/L, preferably $5.0*10^{-5}$ to 1.5 mol/L, more preferably $1.0*10^{-4}$ to 1.0 mol/L, based on the total volume of the electrolyte.

The above object of the present invention is further achieved by an electrolyte for a magnesium air battery comprising an electrolyte additive, which comprises a chelating agent which is capable of forming a complex with at least one of Fe(II) and Fe(III) ions, where the complex with at least one of Fe(II) and Fe(III) ions has a stability constant in aqueous solution at room temperature (about 25° C.) log K of greater than or equal to 6.0 and which is also capable of forming a complex with Mg(II) ions where the complex with Mg(II) ions has a stability constant in aqueous solution at room temperature (about 25° C.) log K of greater than or equal to 4.0.

It is preferred that the electrolyte comprising the electrolyte additive is an aqueous solution comprising at least one inorganic salt selected from the group consisting of alkali metal and alkaline earth metal chlorides, preferably NaCl, alkali metal and alkaline earth metal nitrates, preferably NaNO$_3$, alkali metal and alkaline earth metal nitrites, preferably NaNO$_2$, alkali metal and alkaline earth metal thiocyanates, preferably NaSCN, alkali metal and alkaline earth metal sulfates, preferably Na$_2$SO$_4$, or mixtures thereof. Preferably the electrolyte comprising the electrolyte additive is an aqueous solution comprising alkali metal and alkaline earth metal chlorides, preferably NaCl, alkali metal and alkaline earth metal nitrates, preferably NaNO$_3$, alkali metal and alkaline earth metal thiocyanates, preferably NaSCN or mixtures thereof. More preferably, the electrolyte comprising the electrolyte additive is an aqueous solution comprising alkali metal and alkaline earth metal nitrates, preferably NaNO$_3$, alkali metal and alkaline earth metal thiocyanates, preferably NaSCN or mixtures thereof.

Preferably, the electrolyte comprising the electrolyte additive is an aqueous solution comprising at least one inorganic salt in a concentration of 0.05 to 1 mol/L, preferably 0.05 to 0.8 mol/L, more preferably 0.07 to 0.5 mol/L, even more preferably 0.07 to 0.3 mol/L, in particular 0.1 mol/L, based on the total volume of the electrolyte.

According to a preferred embodiment, the electrolyte comprises one or more of the chelating agents in a concentration of $1.0*10^{-5}$ to 2.0 mol/L, preferably $5.0*10^{-5}$ to 1.5 mol/L, more preferably $1.0*10^{-4}$ to 1.0 mol/L, based on the total volume of the electrolyte.

The above object of the present invention is further achieved by a magnesium air battery comprising at least one anode comprising or consisting of magnesium or a magnesium alloy, at least one cathode, an electrolyte in connection with the at least one anode and cathode, wherein the electrolyte comprises at least one electrolyte additive which comprises a chelating agent which is capable of forming a complex with at least one of Fe(II) and Fe(III) ions, where the complex with at least one of Fe(II) and Fe(III) ions has a stability constant in aqueous solution at room temperature (about 25° C.) log K of greater than or equal to 6.0 and which is also capable of forming a complex with Mg(II) ions where the complex with Mg(II) ions has a stability constant in aqueous solution at room temperature (about 25° C.) log K of greater than or equal to 4.0.

Preferably, the cathode is a gas diffusion electrode. According to a further preferred embodiment, the cathode comprises or consists of active carbon.

EXAMPLES

Preferred embodiments of the present invention are further illustrated by the following, non-limiting examples by referring to the figures below.

The discharge behaviour of a magnesium anode with magnesium of commercial purity (220 ppm Fe, 5 ppm Cu, <2 ppm Ni) in a three electrode setup in a 0.5% (0.086 mol/L) aqueous solution of NaCl as electrolyte including 0.05 M electrolyte additive (chelating agent) was investigated by constant current discharge at a current density of 0.5 mA cm$^{-2}$ for a duration of about 24 hours. The results of these tests are shown in FIG. 1.

The impurity content of the magnesium anode was determined by spark emission spectroscopy. Bare materials were cut into pieces, ground, polished and rinsed with ethanol.

Discharging Tests

The use of the electrolyte additives according to the present invention significantly improves the discharge behaviour of magnesium air batteries, i.e. it increases the battery voltage and reduces or even prevents the voltage drop over time. In particular, as regards magnesium air batteries comprising magnesium of commercial purity (220 ppm Fe, 5 ppm Cu, <2 rpm Ni) anode, the use of the electrolyte additives according to the present invention in the battery electrolyte significantly increases the battery voltage constantly over time. Adding 0.05 mol/h, based on the total volume of the electrolyte of e.g. TIRON (pyrocatechol-3,5-disulphonic acid) increases the battery voltage from about −1.47 V to about 1.75 V constantly over a period of more than 24 hours. Results are summarized in table 1 below:

TABLE 1

Increase in battery voltage upon addition of electrolyte additives according to the present invention to the electrolyte of a magnesium anode for a magnesium air battery. Electrolyte: 0.5% (0.086 mol/L) NaCl mixed with 0.05 mol/L electrolyte additive according to the present invention.

| Electrolyte additive (chelating agent) | Battery voltage [V] with electrolyte additive (average value after 24 hours) | Battery voltage [V] without electrolyte additive (average value after 24 hours) | Increase in battery voltage [mV] upon addition of electrolyte additive |
|---|---|---|---|
| TIRON (pyrocatechol-3,5-disulphonic acid) | −1.735 | −1.477 | 258 |
| NTA | −1.683 | −1.477 | 206 |
| 5-Sulfosalicylic acid | −1.660 | −1.477 | 183 |
| 3,4-Dihydroxy-benzoic acid | −1.658 | −1.477 | 181 |
| 8-HQ-5-sulfonic acid | −1.650 | −1.477 | 173 |
| Salicylic acid | −1.648 | −1.477 | 168 |
| $K_2$ EDTA | −1.575 | −1.477 | 98 |
| Cysteine | −1.570 | −1.477 | 93 |
| DTPA | −1.558 | −1.477 | 81 |
| TTHA | −1.535 | −1.477 | 58 |

The addition of electrolyte additives according to the present invention to the electrolyte leads to a stable battery voltage over time and to a prevention of the voltage drop. For example, the addition of TIRON leads to a substantially stable battery voltage above −1.7 V over 24 hours. This is 250 mV higher than in case of reference sample immersed in pure 0.5% NaCl electrolyte.

Figure 2:
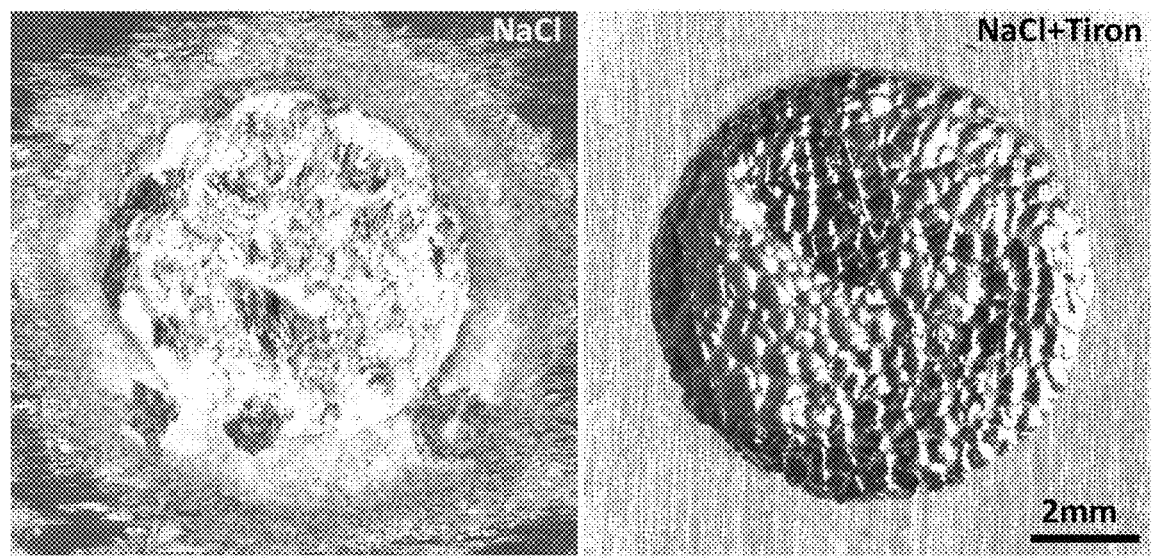
FIG. 2 are optical photographs of samples exposed to various electrolyte.

After 24 hours of exposure to the 0.5% NaCl electrolyte the surface of the magnesium sample is fully covered with a thick layer of black and white corrosion products typical for magnesium. Blocking effect of these corrosion products causes decrease of battery voltage. In contrast, after 24 of exposure to the 0.5% NaCl electrolyte where 0.05 mol/L of any of ten chelating agent (electrolyte additive) listed in Table 1 was added, the surface of the sample is absolutely free from any deposit and exhibits a high luster. In FIG. 2 the optical photographs of the samples exposed to pure NaCl electrolyte and NaCl with TIRON (pyrocatechol-3,5-disulphonic acid) additive are presented.

The invention claimed is:

1. A magnesium air battery comprising at least one anode comprising magnesium or a magnesium alloy; at least one cathode; and an aqueous electrolyte in connection with the at least one anode and at least one cathode, which electrolyte is an aqueous solution comprising at least one inorganic salt selected from the group consisting of alkali metal salts, alkaline earth metal salts, and ammonium salts, or mixtures thereof, the electrolyte further incorporating an electrolyte additive comprising a chelating agent which is capable of forming a complex with at least one of Fe(II) and Fe(III) ions, where the complex with at least one of Fe(II) and Fe(III) ions has a stability constant in aqueous solution at room temperature (about 25° C.) log K of greater than or equal to 6.0 and which is also capable of forming a complex with Mg(II) ions where the complex with Mg(II) ions has a stability constant in aqueous solution at room temperature (about 25° C.) log K of greater than or equal to 4.0.

2. The magnesium battery of claim 1, wherein the cathode is a gas diffusion electrode.

3. The magnesium battery of claim 1, wherein the electrolyte is an aqueous solution comprising at least one inorganic salt selected from the group consisting of alkali metal and alkaline earth metal chlorides, alkali metal and alkaline earth metal nitrates, alkali metal and alkaline earth metal nitrites, alkali metal and alkaline earth metal thiocyanates, alkali metal and alkaline earth metal sulfates, and mixtures thereof.

4. The magnesium battery of claim 1, wherein the electrolyte comprises at least one inorganic salt in a concentration of 0.05 to 1 mol/L, based on the total volume of the electrolyte.

5. The magnesium battery of claim 1, wherein the electrolyte additive is present in the electrolyte in a concentration of $1.0*10^{-5}$ to 2.0 mol/L, based on the total volume of the electrolyte.

6. The magnesium battery of claim 1, wherein the electrolyte additive comprises at least one aminopoly-carboxylate, hydroxycarboxylate, hydroxysulfonate or amino acid chelating agent, or salts thereof and/or mixtures thereof.

7. The magnesium battery of claim 1, wherein the electrolyte additive comprises at least one of ethylenediaminetetraacetic acid (EDTA), diethylenetriamine-pentaacetic acid (DTPA), triethylenetetraamine-hexaacetic acid (TTHA), ethylenediamine-N,N'-bis(2-hydro-xyphenyl-acetic acid) (EDDHA), N-(2-hydroxyethyl)-ethylene-diamine-N,N,N'-triacetic acid (HEDTA), ethyleneglycol-bis(amino-ethylether)-N,N,N',N'-tetraacetic acid (EGTA), 1,2-Bis(2-aminophenoxy)ethane-N,N,N',N'-acetic acid (BAPTA), N,N-bis(carboxymethyl)-L-glutamate (GLDA), trans-1,2-diamino-cyclohexane-N,N,N',N'-tetra-acetic acid (CDTA), nitrolotriacetic acid (NTA), salts thereof and mixtures thereof.

8. The magnesium battery claim 1, wherein the electrolyte additive comprises at least one of salicylic acid and its derivatives, methylsalicylic acid, aminosalicylic acid, 3,4-dihydroxybenzoic acid, salts thereof and mixtures thereof.

9. The magnesium battery of claim 1, wherein the electrolyte additive comprises at least one of 8-Hydroxyquinoline-5-sulfonic acid or pyrocatechol-3,5 disulphonic acid, salts thereof and mixtures thereof.

10. The magnesium battery of one of claim 1, wherein the electrolyte additive comprises at least one of asparagine, cysteine, salts thereof and mixtures thereof.

11. The magnesium battery of claim 8, wherein said salicylic acid derivative is selected from the group consisting of sulfosalicylic acid, methylsalicylic acid, aminosalicylic acid, and salts and mixtures thereof.

12. The magnesium battery of claim 8, wherein said salicylic acid derivative comprises 5-sulfosalicylic acid or salts thereof.

13. The magnesium battery of claim 8, wherein said salicylic acid derivative comprises 5-methylsalicylic acid or salts thereof.

14. The magnesium battery of claim 8, wherein the electrolyte additive comprises 3,4-dihydroxybenzoic acid or salts thereof.

* * * * *

UNITED STATES PATENT AND TRADEMARK OFFICE
CERTIFICATE OF CORRECTION

PATENT NO. : 10,637,117 B2
APPLICATION NO. : 15/689498
DATED : April 28, 2020
INVENTOR(S) : Sviatlana Lamaka, Daniel Höche and Mikhail Zheludkevich Page 1 of 1

It is certified that error appears in the above-identified patent and that said Letters Patent is hereby corrected as shown below:

On the Title Page

(73) Assignee should read:
--Helmholtz-Zentrum Geesthacht Zentrum Fuer Material- und Kuestenforschung GmbH--

Signed and Sealed this
Thirteenth Day of October, 2020

Andrei Iancu
*Director of the United States Patent and Trademark Office*